United States Patent [19]

Leger et al.

[11] 4,419,422

[45] Dec. 6, 1983

[54] SULFIDE-CONTAINING CATHODE FOR NONAQUEOUS CELLS

[75] Inventors: Violeta Z. Leger, North Olmsted; William P. Evans, Rocky River, both of Ohio

[73] Assignee: Union Carbide Corporation, Danbury, Conn.

[21] Appl. No.: 360,850

[22] Filed: Mar. 22, 1982

[51] Int. Cl.³ .................. H01M 6/14; H01M 4/58; H01M 4/34; H01M 4/36
[52] U.S. Cl. ............................. 429/194; 429/218; 429/219; 429/220; 429/221; 429/222; 429/223; 429/224; 429/225; 429/229
[58] Field of Search ............... 429/219, 220, 221, 222, 429/223, 224, 225, 226, 229, 194, 232, 218

[56] References Cited

U.S. PATENT DOCUMENTS 3,961,987  6/1976  Mund et al. .................. 429/221
4,136,233  1/1979  Eisenberg .
4,302,520  11/1981  Evans et al. .

FOREIGN PATENT DOCUMENTS 2381395  2/1977  France .
  26845  9/1979  France .
2465326  9/1979  France .
54-25560 11/1979  Japan .

OTHER PUBLICATIONS

Chemical Abstracts, vol. 76, p. 599, No. 135011u, vol. 73, p. 304, No. 113934H, vol. 92, p. 510, No. 171516B.

*Primary Examiner*—G. Ozaki
*Assistant Examiner*—Stephen J. Kalafut
*Attorney, Agent, or Firm*—Cornelius F. O'Brien

[57] ABSTRACT

A sulfide-containing cathode for nonaqueous cells such as $AgBiS_2$, $Co_2Bi_2S_5$, $CoBi_2S_4$ and $FeSb_2S_4$.

6 Claims, 7 Drawing Figures

SULFIDE-CONTAINING CATHODE FOR NONAQUEOUS CELLS

TECHNICAL FIELD

The invention relates to a sulfide-containing cathode for nonaqueous cells which cathode has the formula:

$$M_a M'_b S_c$$

where

M is one or more mono- or divalent metals selected from the group consisting of Co, Ni, Fe, Sn, Pb, Mn, Zn, Cd, Hg, Cu and Ag;

M' is at least one material selected from the group consisting of trivalent arsenic (As), antimony (Sb), and bismuth (Bi) with the proviso that when MM' is a binary metal combination then when M' is Sb, M cannot be Pb or Sn; and when M' is Bi, M cannot be Fe, Sn or Pb;

S is sulfur (as sulfide); and a, b and c are each integers with each being equal to or greater than 1 with the proviso that when M is monovalent, $c=(a+3b)/2$ and when M is divalent, $c=(2a+3b)/2$.

BACKGROUND ART

The development of high energy battery systems requires the compatibility of an electrolyte possessing desirable electrochemical properties with highly reactive anode materials, such as lithium, sodium, and the like, and the efficient use of high energy density cathode materials. The use of aqueous electrolytes is precluded in these systems since the anode materials are sufficiently active to react with water chemically. It has, therefore, been necessary in order to realize the high energy density obtainable through the use of these highly reactive anodes and high energy density cathodes to turn to the investigation of nonaqueous electrolyte systems and more particularly to nonaqueous organic electrolyte systems. A large number of nonaqueous organic electrolyte solutions is taught in the art as being suitable for a wide variety of cell systems.

Although a large number of known solid cathode materials is suitable for nonaqueous cell systems, there is always a need for new solid cathode materials to help fill the demand created by the large number of battery-powered devices being marketed. For example, the toy industry has recently embarked upon a program of marketing a multiplicity of computerized games some of which are educational in nature. Many of these devices require portable power sources and, therefore, any new cell system would be welcomed.

It is an object of the present invention to provide new solid cathode materials for nonaqueous cell systems.

It is another object of the present invention to provide a new nonaqueous cell system employing new solid cathode materials of mixed sulfides.

Another object of the present invention is to provide new cathode materials such as $AgBiS_2$, $Co_2Bi_2S_5$, $FeSb_2S_4$ and $CoBi_2S_4$.

SUMMARY OF THE INVENTION

The invention is directed to a new solid cathode material for nonaqueous cell systems which comprises a sulfide-containing cathode having the formula:

$$M_a M'_b S_c$$

where

M is one or more mono- or divalent metals selected from the group consisting of Co, Ni, Fe, Sn, Pb, Mn, Zn, Cd, Hg, Cu and Ag;

M' is at least one material selected from the group consisting of trivalent arsenic (As), antimony (Sb), and bismuth (Bi) with the proviso that when MM' is a binary metal combination then when M' is Sb, M cannot be Pb or Sn; and when M' is Bi, M cannot be Fe, Sn or Pb;

S is sulfur (as sulfide); and a, b and c are each integers with each being equal to or greater than 1 with the proviso that when M is monovalent, $c=(2a+3b)/2$ and when M is divalent, $c=(2a+3b)/2$.

Examples of preferred cathodes of this invention are $AgBiS_2$, $Co_2Bi_2S_5$, $FeSb_2S_4$ and $CoBi_2S_4$. The cathode materials $CoBi_2S_4$ and $Co_2Bi_2S_5$ can generally be prepared by heating elemental bismuth, cobalt and sulfur at about 550° C. for about 1.5 hours. The cathode material $AgBiS_2$ can generally be prepared by mixing elemental bismuth, silver and sulfur and then fusing the mixture at about 750° C. for about 1 hour and 40 minutes. $FeSb_2S_4$ can be obtained as the mineral berthierite. If desired, the active cathode material can be mixed with a binder, a conductive agent and the like. Suitable binders would include polytetrafluoroethylene, polyethylene, a polysulfone, polypropylene and a polyamide, and conductive agents would include graphite, carbon and metal powders.

Other suitable cathodes for this invention would include the following:

| | |
|---|---|
| $Cu_3AsS_4$* | $CuBiS_2$ |
| $AgAsS_2$ | $CuBi_5S_8$ |
| $Pb_7Sb_8S_{19}$ | $Cu_3Bi_5S_9$ |
| $Pb_{22}Sb_{26}S_{61}$ | $Cu_4Bi_4S_9$* |
| $Pb_{17}(Sb,As)_{16}S_{41}$ | $Cu_8Bi_{12}S_{22}$ |
| $AgSbS_2$ | $Cu_{10}Bi_{12}S_{23}$ |
| $Ag_3SbS_3$ | $Pb_5(Sb,Bi)_8S_{17}$ |

*These materials apparently contain Cu in a mixed valence state.

Useful highly active metal anode materials include aluminum, the alkali metals, alkaline earth metals and alloys of alkali metals or alkaline earth metals with each other and other metals. The term "alloy" as used herein and in the appended claims is intended to include mixtures, solid solutions, such as lithium-magnesium, and intermetallic compounds, such as lithium monoaluminide.

The preferred anode materials are lithium, sodium, potassium, calcium and alloys thereof.

Useful organic solvents employed alone or mixed with one or more other solvents for use in this invention include the following classes of compounds:

Alkylene nitriles: e.g., crotonitrile (liquid range −51.1° C. to 120° C.)

Trialkyl borates: e.g., trimethyl borate, $(CH_3O)_3B$ (liquid range −29.3° to 67° C.)

Tetraalkyl silicates: e.g., tetramethyl silicate, $(CH_3O)_4Si$ (boiling point 121° C.)

Nitroalkanes: e.g., nitromethane, $CH_3NO_2$ (liquid range −17° to 100.8° C.)

Alkylnitriles: e.g., acetonitrile, $CH_3CN$ (liquid range −45° to 81.6° C.)

Dialkylamides: e.g. dimethylformamide, HCON(CH₃)₂ (liquid range −60.48° to 149° C.)

Lactams: e.g., N-methylpyrrolidone,

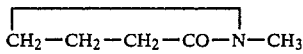

(liquid range −16° to 202° C.)

Tetraalkylureas: e.g., tetramethylurea, (CH₃)₂N-CO-N(CH₃)₂ (liquid range −1.2° to 166° C.)

Monocarboxylic acid esters: e.g., ethyl acetate (liquid range −83.6° to 77.06° C.)

Orthoesters: e.g., trimethylorthoformate, HC(OCH₃)₃ (boiling point 103° C.)

Lactones: e.g., γ-(gamma) butyrolactone,

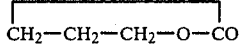

(liquid range −42° to 206° C.)

Dialkyl carbonates: e.g., dimethyl carbonate, OC(OCH₃)₂ (liquid range 2° to 90° C.)

Alkylene carbonates: e.g., propylene carbonate,

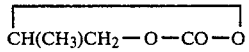

(liquid range −48° to 242° C.)

Monoethers: e.g., diethyl ether (liquid range −116° to 34.5° C.)

Polyethers: e.g., 1,1- and 1,2-dimethoxyethane (liquid ranges −113.2° to 64.5° C. and −58° to 83° C., respectively)

Cyclic ethers: e.g., tetrahydrofuran (liquid range −65° to 67° C.); 1,3-dioxolane (liquid range −95° to 78° C.)

Nitroaromatics: e.g., nitrobenzene (liquid range 5.7° to 210.8° C.)

Aromatic carboxylic acid halides: e.g., benzoyl chloride (liquid range 0° to 197° C.); benzoyl bromide (liquid range −24° to 218° C.)

Aromatic sulfonic acid halides: e.g., benzene sulfonyl chloride (liquid range 14.5° to 251° C.)

Aromatic phosphonic acid dihalides: e.g., benzene phosphonyl dichloride (boiling point 258° C.)

Aromatic thiophosphonic acid dihalides: e.g., benzene thiophosphonyl dichloride (boiling point 124° C. at 5 mm.)

Cyclic sulfones: e.g., sulfolane,

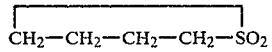

(melting point 22° C.); 3-methylsulfolane (melting point −1° C.)

Alkyl sulfonic acid halides: e.g., methanesulfonyl chloride (boiling point 161° C.)

Alkyl carboxylic acid halides: e.g., acetyl chloride (liquid range −112° to 50.9° C.); acetyl bromide (liquid range −96° to 76.° C.); propionyl chloride (liquid range −94° to 80° C.)

Saturated heterocyclics: e.g., tetrahydrothiophene (liquid range −96° to 121° C.); 3-methyl-2-oxazolidone (melting point 15.9° C.)

Dialkyl sulfamic acid halides: e.g., dimethyl sulfamyl chloride (boiling point 80° C. at 16 mm.)

Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfide (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.)

The preferred solvents are sulfolane; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate 1,1- and 1,2-dimethoxyethane, and 1,3-dioxolane because they appear more chemically inert to battery components and have wide liquid ranges, and especially because they permit highly efficient utilization of the cathode materials.

The best electrolyte for use in this invention is a 3-methyl-2-oxazolidone-based electrolyte. Liquid organic 3-methyl-2-oxazolidone material, (3Me2Ox)

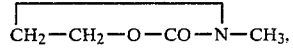

is an excellent nonaqueous solvent because of its high dielectric constant, chemical inertness to battery components, wide liquid range and low toxicity.

However, it has been found that when metal salts are dissolved in liquid 3Me2Ox for the purpose of improving the conductivity of 3Me2Ox, the viscosity of the solution may be too high for its efficient use as an electrolyte for some nonaqueous cell applications other than those requiring very low current drains. Thus, in some applications in accordance with this invention, the addition of a low viscosity cosolvent would be desirable if 3Me2Ox is to be used as an electrolyte for nonaqueous cells which can operate or perform at a high energy density level.

The low viscosity cosolvents which can be used along with 3Me2Ox include tetrahydrofuran (THF), methyl-substituted tetrahydrofuran (Met-THF) dioxolane (DIOX), dimethoxyethane (DME), dimethyl isoxazole (DMI), diethyl carbonate (DEC), ethylene glycol sulfite (EGS), dioxane, dimethyl sulfite (DMS) or the like. Dimethoxyethane (DME) and dioxolane (DIOX) are preferred cosolvents because of their compatability with metal salts dissolved in liquid 3Me2Ox and their chemical inertness to cell components. Specifically, the total amount of the low viscosity cosolvent added could be between about 20% and about 80% based on total solvent volume, i.e., exclusive of solute, so as to lower the viscosity to a level suitable for use in a high drain cell.

The ionizing solute for use in the invention may be simple or double salt or mixtures thereof, for example, $LiCF_3SO_3$, $LiBF_4$ and $LiClO_4$ which will produce an ionically conductive solution when dissolved in one or more solvents. Preferred solutes are complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the component's alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride.

EXAMPLE I

Figure 1:
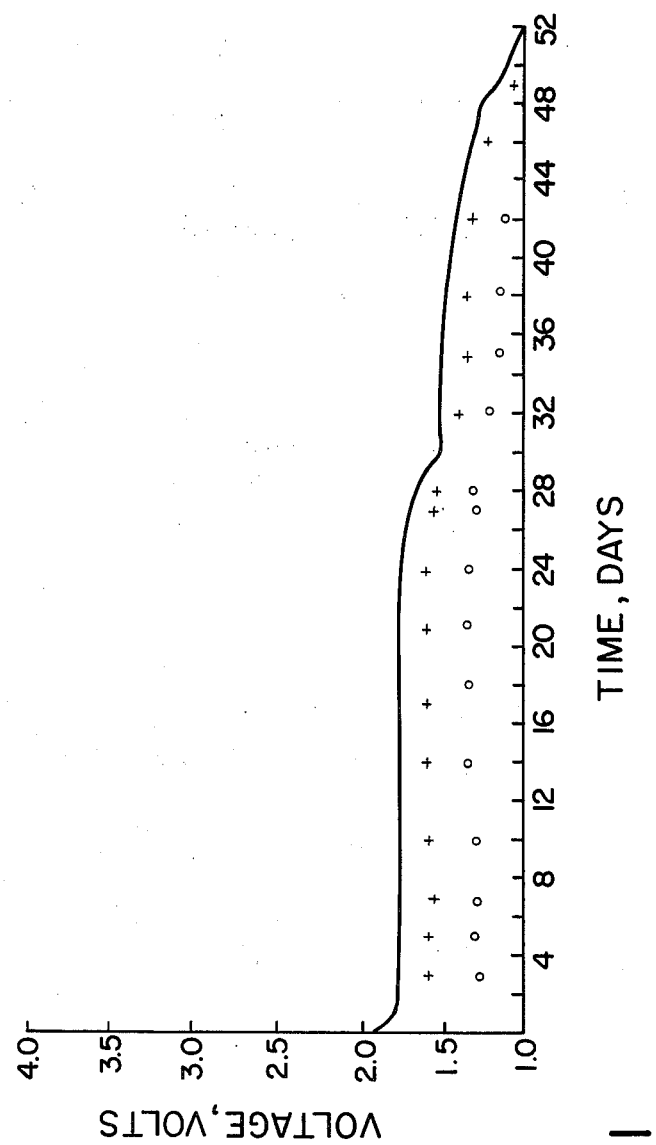
FIG. 1 contains data showing the discharge characteristics of the cell disclosed and described in Example I.

Experimental flooded (i.e. excess electrolyte) cells were constructed utilizing a stainless steel base having therein a shallow depression into which the cell contents were placed and over which a stainless steel cap was placed to close the cell. The contents of each sample cell consisted of a 0.591 inch diameter lithium disc (0.114 g) having a total thickness of 0.050 inch, about 1.5 ml of an electrolyte consisting of about 40 vol. % dioxolane, about 30 vol. % dimethoxyethane (DME), about 30 vol. % 3Me2Ox plus about 0.1% dimethylisoxazole (DMI) and containing 1 M $LiCF_3SO_3$, a 0.875 inch diameter porous nonwoven polypropylene separator (0.01 inch thick) which absorbed some of the electrolyte and 0.385 gram of a cathode mix compressed to form a cathode. The cathode mix consisted of 85% $CoBi_2S_4$, 10% acetylene black and 5% polytetrafluoroethylene. Each cell was discharged across a 15K-ohm load and the voltage observed with time is shown as the curve in FIG. 1. In addition, at various time periods, the cell was discharged across a superimposed 1K-ohm load (pulse discharge) for about 2 seconds, and the average voltages observed are shown as the points identified as "+" in FIG. 1. At 2-second random pulsing across a superimposed 300-ohm load, the average voltages observed are shown as the points identified as "o" in FIG. 1.

EXAMPLE II

Figure 2:
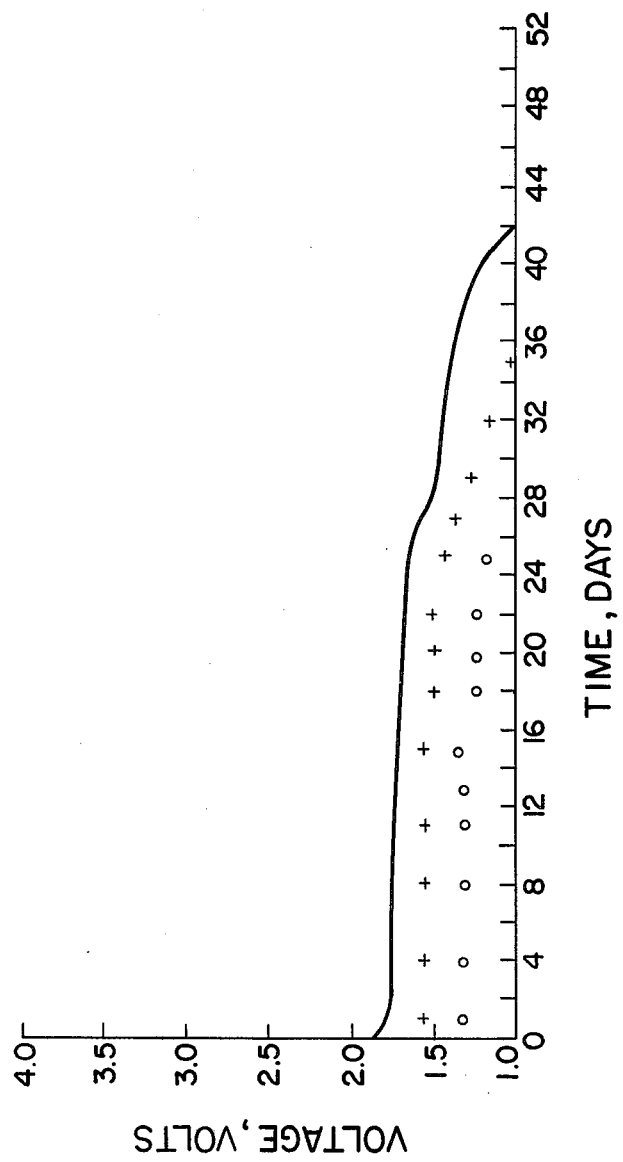
FIG. 2 contains data showing the discharge characteristics of the cell disclosed and described in Example II.

A 0.455 inch high and 0.165 inch thick button cell was made as in Example I using the same components except in the following amounts: 0.037 g lithium; 0.43 g cathode mix with 0.367 g active material and 0.14 ml of the electrolyte. The cell was tested in the same manner and the voltages observed on the constant discharge and pulse discharge tests are shown in FIG. 2. Again the voltages on 2-second pulse discharge across a superimposed 1K-ohm load are identified as "+", while the voltages on 2-second pulse discharge across the superimposed 300-ohm load are identified as "o".

EXAMPLE III

Figure 3:
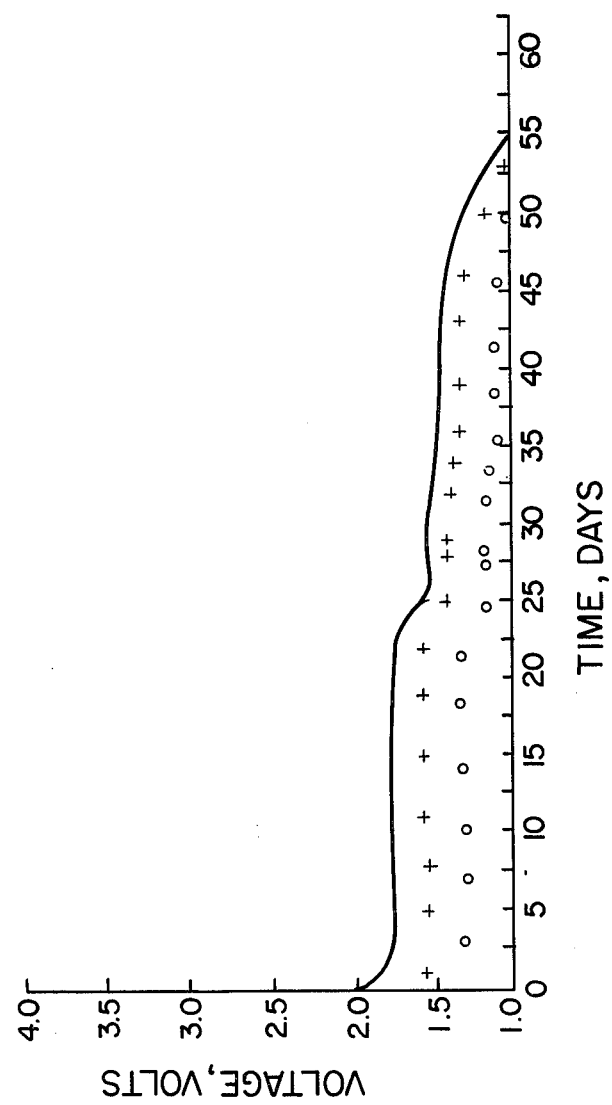
FIG. 3 contains data showing the discharge characteristics of the cell disclosed and described in Example III.

A flat-type cell was constructed as in Example I using the same components except that the active cathode material employed was $Co_2Bi_2S_5$. Specifically, the cell comprised 0.092 g lithium, 0.499 g cathode mix with 0.424 g of active material and 1.5 ml of the electrolyte. The cell was discharged across a 15K-ohm load and the voltage observed with time is shown as the curve in FIG. 3. In addition, at various time periods, the cell was discharged across a superimposed 1K-ohm load or a superimposed 300-ohm load (pulse discharge) for about 2 seconds and the voltages observed are shown as the points identified as "+" or "o", respectively, in FIG. 3.

EXAMPLE IV

Figure 4:
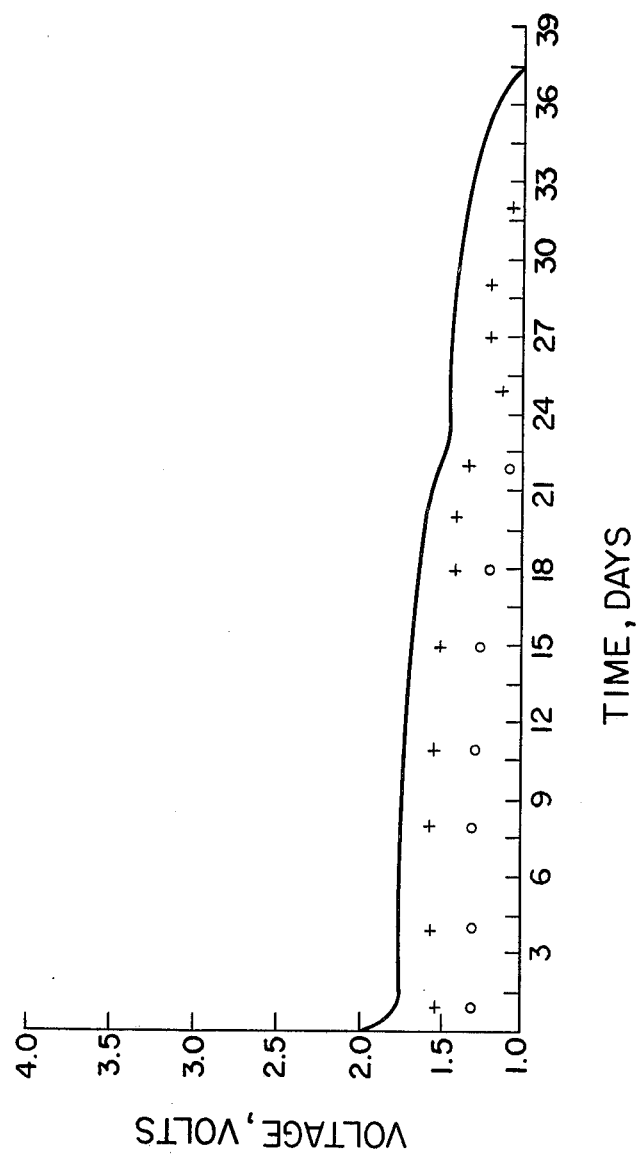
FIG. 4 contains data showing the discharge characteristics of the cell disclosed and described in Example IV.

A button cell was constructed as in Example II using the same components except that the active cathode material employed was $Co_2Bi_2S_5$. Specifically, the cell comprised 0.037 g of lithium, 0.434 g of cathode mix with 0.369 g of active material and 0.14 ml of the electrolyte. The button cell was discharged, across a 15K-ohm load and the voltage observed with time is shown as the curve in FIG. 4. In addition, at various time periods, the cell was discharged across a superimposed 1K-ohm load or a superimposed 300-ohm (pulse discharge) for about 2 seconds, and the voltages observed are shown as the points identified as "+" or "o", respectively, in FIG. 4.

EXAMPLE V

Figure 5:
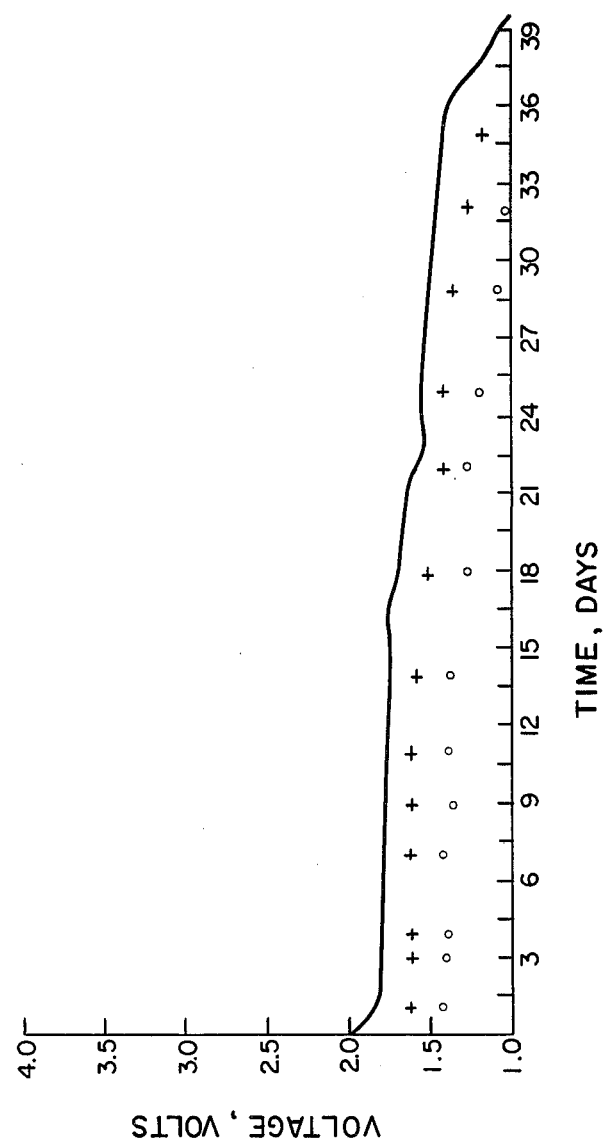
FIG. 5 contains data showing the discharge characteristics of the cell disclosed and described in Example V.

A button cell was constructed as in Example IV using the same components. At 35° C. the button cell was discharged across a 15K-ohm load and the voltage observed with time is shown as the curve in FIG. 5. In addition, at various time periods, the cell was discharged across a superimposed 1K-ohm load or a superimposed 300-ohm load (pulse discharge) for about 2 seconds, and the voltages observed are shown as the points identified as "+" or "o", respectively, in FIG. 5.

EXAMPLE VI

Figure 6:
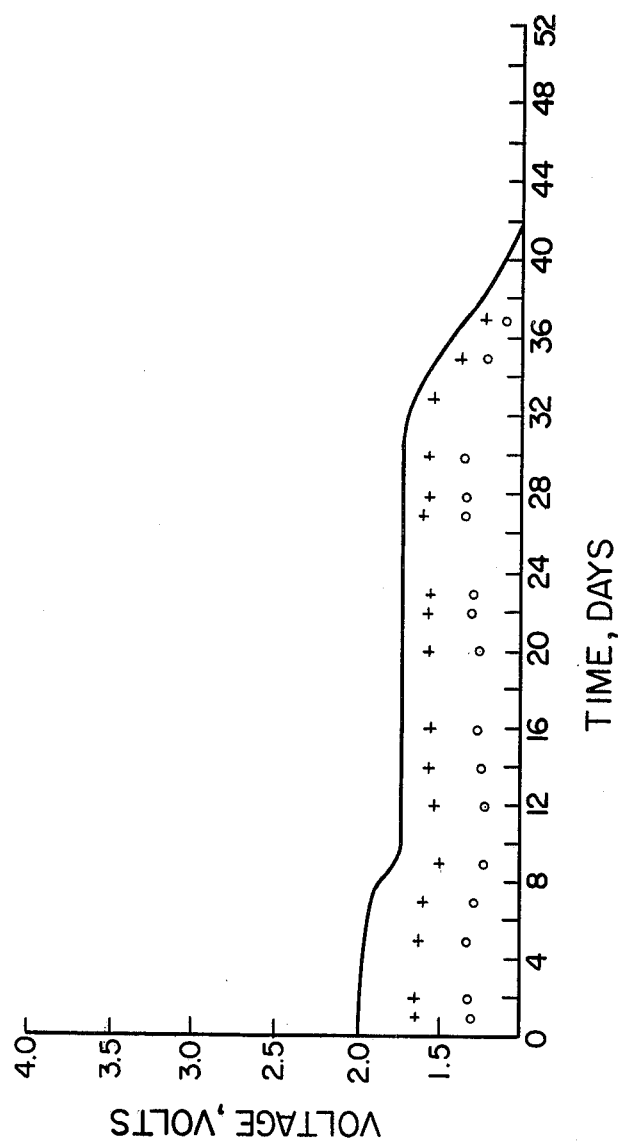
FIG. 6 contains data showing the discharge characteristics of the cell disclosed and described in Example VI.

A flat-type cell was constructed as in Example I using the same components except the active cathode material employed was AgBiS$_2$. Specifically, the cell comprised 0.092 g of lithium, 0.454 g of cathode mix with 0.386 g of active material and 1.5 ml of the electrolyte. The cell was discharged across a 15K-ohm load and the voltage observed with time is shown as the curve in FIG. 6. In addition, at various time periods, the cell was discharged across a superimposed 1K-ohm load or a superimposed 300-ohm load (pulse discharge) for about 2 seconds and the voltages observed are shown as the points identified as "+" or "o", respectively, in FIG. 6.

EXAMPLE VII

Figure 7:
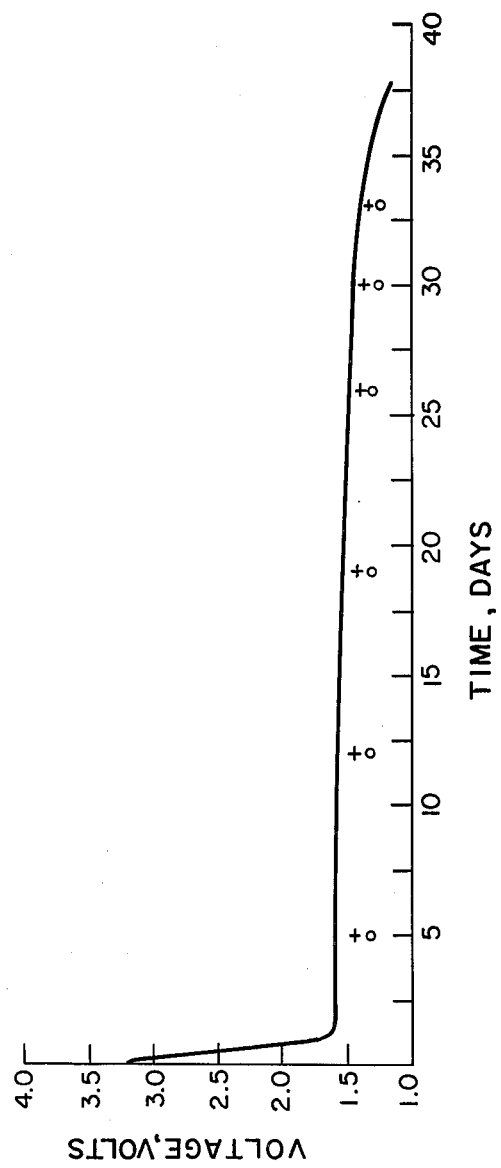
FIG. 7 contains data showing the discharge characteristics of the cell disclosed and described in Example VII.

A flat-type experimental cell was assembled using a nickel container within which the internal cell diameter was 1 cm and the total internal cell height was 0.110 inch (0.060 in. thick cathode, 0.010 in. thick separator, 0.030 in. thick lithium anode and a 0.010 in. thick contact plate on top of the lithium). The cell contained 0.319 g lithium, 0.407 g of cathode mix (75 wt.% FeSb$_2$S$_4$, 13.3% graphite, 2.7% acetylene black and 9% polytetrafluoroethylene binder), and 1.3 ml of the electrolyte of Example I. The electrode interfacial area was 0.785 cm$^2$. The cell was discharged across a 10K-ohm load and the voltage observed with time is shown in FIG. 7. In addition, at various time periods, the cell was discharged across a superimposed 700-ohm load or a superimposed 300-ohm load (pulse discharge) for about 2 seconds and the voltages observed are shown as the points identified as "+" or "o", respectively, in FIG. 7. It should be noted that the average discharge current density on the pulse loads was 2.7 mA/cm$^2$ for the 700-ohm load and 6.4 mA/cm$^2$ for the 300-ohm load.

While the present invention has been described with reference to many particular details thereof, it is not intended that these details shall be construed as limiting the scope of this invention.

We claim:

1. A nonaqueous cell comprising an active anode, an organic electrolyte solution and a solid cathode material comprising a sulfide-containing cathode having the formula:

$$M_a M'_b S_c$$

where
   M is one or more mono- or divalent metals selected from the group consisting of Co, Ni, Fe, Sn, Pb, Mn, Zn, Cd, Hg, Cu and Ag;
   M' is at least one material selected from the group consisting of trivalent arsenic (As), antimony (Sb), and bismuth (Bi) with the proviso that when MM' is a binary metal combination then when M' is Sb, M cannot be Pb or Sn and when M' is Bi, M cannot be Fe, Sn or Pb;
   S is sulfur (as sulfide); and
   a, b and c are each integers with each being equal to or greater than 1 with the proviso that when M is monovalent, c=(a+3b)/2 and when M is divalent, c=(2a+3b)/2.

2. The nonaqueous cell of claim 1 wherein the solid cathode material is selected from the group consisting of CoBi$_2$S$_4$, Co$_2$Bi$_2$S$_5$, AgBiS$_2$ and FeSb$_2$S$_4$.

3. The nonaqueous cell of claim 1 or 2 wherein at least one material selected from the group consisting of graphite, carbon, metal powders, polytetrafluoroethylene, polyethylene, polysulfones, polypropylene and polyamides, is added to the solid cathode material.

4. The nonaqueous cell of claim 3 wherein the active metal anode is selected from the group consisting of lithium, sodium, potassium, calcium and alloys thereof.

5. The nonaqueous cell of claim 4 wherein the solvent of the electrolyte is at least one solvent selected from the group consisting of sulfolane; tetrahydrofuran; methyl-substituted tetrahydrofuran; 1,3-dioxolane; 3-methyl-2-oxazolidone; propylene carbonate; γ-butyrolactone; ethylene glycol sulfite; dimethylsulfite, dimethyl sulfoxide; 1,1- and 1,2-dimethoxyethane; and dimethyl isoxazole.

6. The nonaqueous cell of claim 5 wherein said at least one solvent is 3-methyl-2-oxazolidone along with a low viscosity solvent selected from the group consisting of tetrahydrofuran, methyl-substituted tetrahydrofuran, dioxolane, dimethoxyethane, dimethyl isoxazole, diethyl carbonate, ethylene glycol sulfite, dioxane and dimethyl sulfite.

* * * * *